Oct. 6, 1936.   J. E. LINABURY   2,056,528
METHOD OF MAKING FLANGED BRAKE DRUMS
Filed April 1, 1935   2 Sheets-Sheet 1
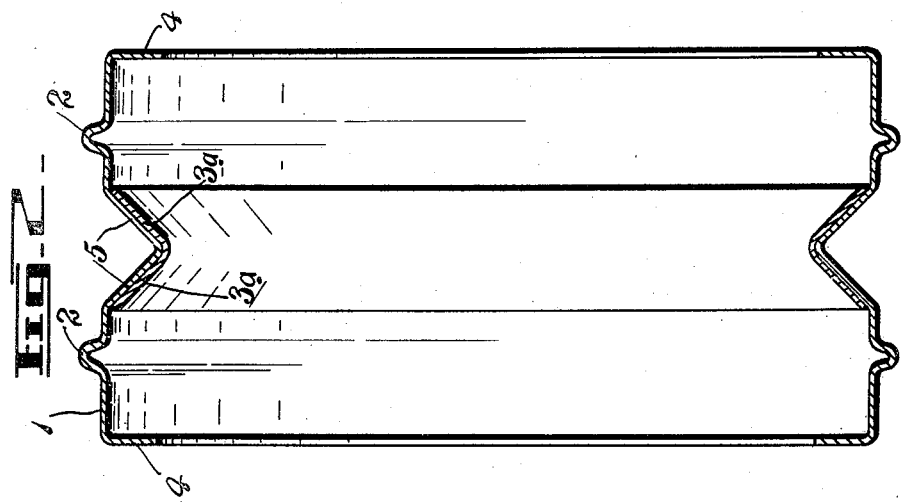
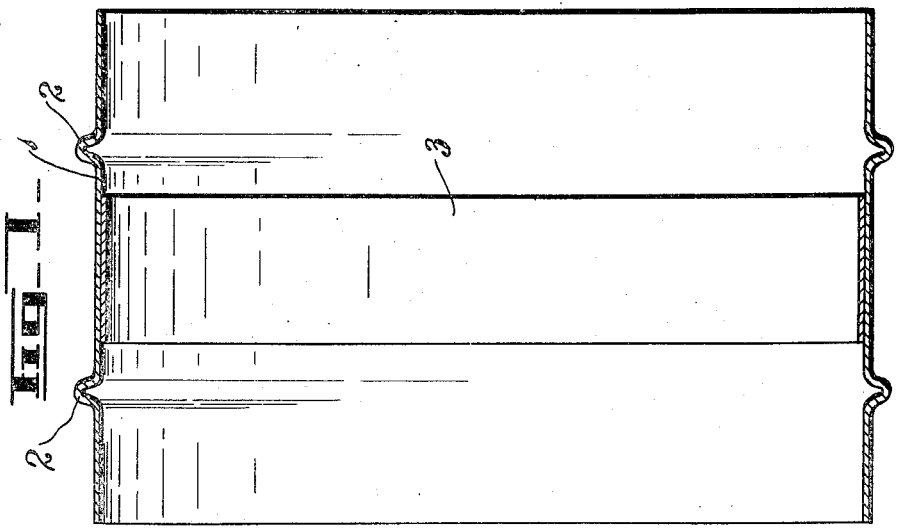
INVENTOR
John E. Linabury
BY Liverance & Van Antwerp
ATTORNEY

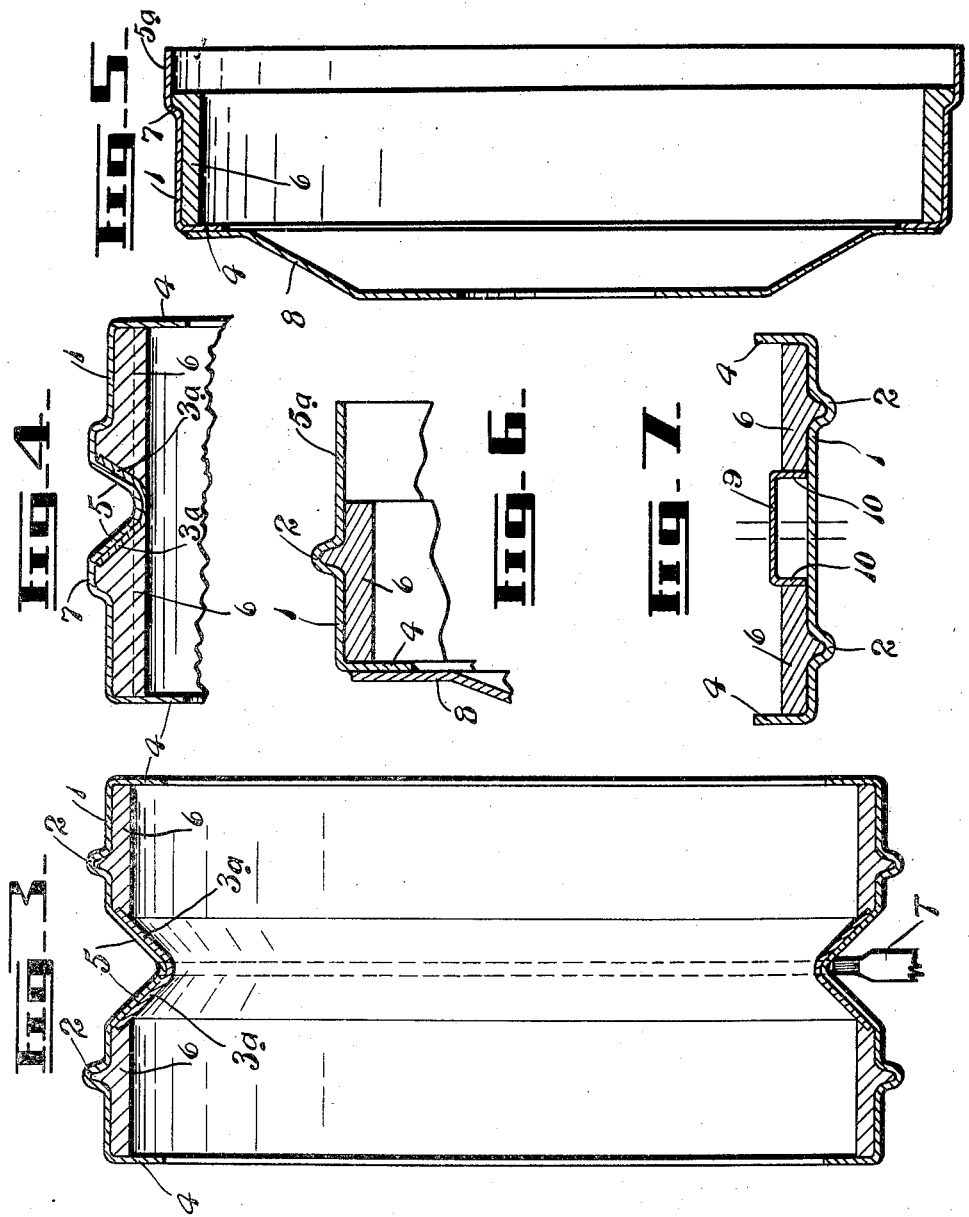

Patented Oct. 6, 1936

2,056,528

UNITED STATES PATENT OFFICE 2,056,528

METHOD OF MAKING FLANGED BRAKE DRUMS

John E. Linabury, Muskegon, Mich., assignor to Campbell, Wyant & Cannon Foundry Company, Muskegon, Mich., a corporation of Michigan Application April 1, 1935, Serial No. 14,075

6 Claims. (Cl. 29—152.2)

This invention relates to brake drums having a wrought metal outer supporting shell lined with cast metal which is inseparably and in effect integrally bonded or joined to the outer shell. In practice the outer wrought metal shell is preferably of steel and the cast metal inner braking material is of cast iron fused to the shell.

Brake drums of this character are mounted upon wheels and within the brake drum, to bear and press against the cast metal lining, brake shoes and mechanism to operate the same are mounted whereby when the brake shoes are pressed outwardly against the inner surface of the cast metal lining the rotation of the drum and, through the connection of the drum to the wheel, the rotation of the wheel are checked and at times stopped by reason of the retarding forces developed by said pressure against the rotating braking surface.

It is very desirable in many instances that the shell shall project beyond the cast metal to form a shield and a more or less seal against the entrance of dust, water, dirt and the like, which if it does enter and is between the brake shoes and the braking surface against which the shoes bear, detrimentally affects both by excessive wearing, cutting or scoring the same. The shielding or protecting of the brake shoes and the brake drums is very desirable.

The present invention is concerned with the production of a brake drum of the character described and is also concerned with a novel method for economically and expeditiously producing the said novel brake drums in large quantities. The invention may be understood from the following description, taken in connection with the accompanying drawings, in which Fig. 1 is a central longitudinal sectional view of an annular shell of steel used in producing the braking flanges of two brake drums as the same appears after the first step of the method has been followed.

Fig. 2 is a like sectional view after the outer double width shell has been formed ready for lining the same with centrifugally cast metal.

Fig. 3 is a similar sectional view showing the same after the cast lining has been applied to the shell.

Fig. 4 is a fragmentary section similar to that shown in Fig. 3 showing a modified form of double width composite brake drum structure.

Fig. 5 is a central vertical section through a completed brake drum, two of which may be made from the structure illustrated in Fig. 4.

Fig. 6 is a fragmentary sectional view of the completed brake drum, two of which may be made from the structure illustrated in Fig. 3, and Fig. 7 is a fragmentary section through a double width brake drum structure showing a different form of means to be used in providing a double width structure from which to make two brake drum flanges, each having a continuous wrought metal annular shield portion extending beyond the cast metal.

Like reference characters refer to like parts in the different figures of the drawings.

With my invention a length of low carbon sheet steel of the proper width for making two brake drums is provided and is rolled into cylindrical form 1 and provided with outwardly extending annular ribs 2, if desired. The ends of the length of steel after it has been rolled into cylindrical form are welded together to make a cylindrical shell. While in this form a short cylindrical member 3, also preferably of low carbon steel, is placed within the cylinder 1 midway between its ends. The ends of the cylindrical shell 1 are then turned inwardly substantially at right angles to provide annular inwardly extending continuous flanges. The intermediate portion of the shell 1 is rolled and pressed inwardly over the area outside of the member 3, making a relatively deep V-shaped continuous annular groove having the sides 5 thereof located at an angle to each other, which in Fig. 2 approximates a right angle, though such right angle is not in any sense essential to the carrying out of the invention, and it may be changed as may be desired. In such formation of the annular groove the inner member 3 is likewise formed into substantially V-shape, having sides 3a which bear against the inner sides of the sides 5 made by said groove.

As shown in Fig. 4, instead of the continuous annular outwardly extending ribs 2, the shell 1 may be first formed with a relatively wide outwardly pressed annular portion at 7 intermediate the ends of the shell, and the cylindrical member 3 placed therein so that when the annular groove is rolled in the shell 1, the sides 5 of the groove join with the raised portions 7 remaining as shown in Fig. 4. The inner member 3 will likewise be bent into conformity with the V-shaped groove made in the outer supporting shell 1, as shown in Fig. 4.

In either case the double width shell shaped into the form shown in Figs. 2 and 3 or shaped as shown in Fig. 4 are heated to the necessary temperature, in the neighborhood of 1500° F., and very high temperature molten iron is deposited in said shell while the shell is rotated at high speed about its longitudinal axis. The temperature of the molten iron preferably will not exceed 3000° F. and be not below in the neighborhood of 2700° to 2750°. The flanges 4 serve as retaining sides for the molten iron until it has solidified. The molten iron joins with the steel against which it comes in contact and fuses intimately therewith and makes an integral, non-separable joinder of the cast iron liner 6 with those portions of the steel shell with which it comes in contact thereby producing the structures illustrated in Figs. 3 and 4. In Fig. 3 the cast iron liner 6 extends between the inner side of each flange 4 to the sides 5 and 3a previously described, while in Fig. 4 the groove, being of lesser depth, the cast iron liner 6 extends between said flanges 4 and substantially covers the annular sides 3a as shown. But in either case the inwardly pressed annular groove which has been formed in the shell serves to divide the cast iron liner 6 into two sections, one at each side of a transverse plane midway between the ends of the shell.

To complete the brake drums, the succeeding step is to divide the cast lined shell midway between its ends, as by use of a cutting tool T, at the bottom of the inwardly extending annular groove, as indicated in Fig. 3, thereby providing two drum parts each lined with a cast iron liner 6. The sides 5 may then be bent outwardly to aline with the cylinder 1 and extend directly therefrom as at 5a in Figs. 5 and 6. The brake drums are completed by welding or otherwise permanently securing a back or web 8 to the flange 4, one of which is present in each of the two parts into which the original structures, such as shown in Figs. 3 and 4, are divided.

It will be evident that there is thus provided a composite brake drum having an outer supporting annular shell (the shell 1) of wrought metal, and with a cast liner of continuous annular form (the liner 6) joined therewith, and with the length of the liner less than the length of the shell, to thereby form an extending cylindrical shield portion 5a beyond the end of the cast metal liner 6. Using the structure shown in Fig. 3, the length of the shield 5a is longer than when a structure such as shown in Fig. 4 is used; and of course in any event the depth to which the continuous annular groove midway between the ends of the steel cylindrical shell is pressed, in conjunction with the width of the cut made by the tool T govern the lengths of the shield extensions 5a. It will further be evident that when the double width composite structure shown in Fig. 3 is divided into two parts that the sides 3a may be readily removed from the sides 5 of the groove formed, there being no connection except such as may be between the liner part 6 shown in Fig. 3 and the relatively small areas of contact of such liner with the sides 3a. In Fig. 4, however, there will be fusion of the liner parts 6 to the parts 3a. In any event the exposed edges of the liner part 6a will be machined and in both cases the parts 3a may be separated by cutting inwardly with a tool at the proper places so as to separate the steel parts 3a from the cast parts 6.

In Fig. 7 a double width shell 1 with inturned annular flanges 4 is used, but instead of pressing inwardly a continuous annular groove, at the inside of the shell there is placed a circular ring channel shaped in cross section having a web 9 and outturned flanges 10. The web 9 is spaced from the shell 1 by the width of such flanges 10 which at their edges bear against the inner sides of the shell 1 at spaced apart points. This channel ring is located midway between the ends of the shell 1 and held in such position during the time of deposition of the molten metal. Then by dividing the double width composite structure produced midway between its ends there are provided two annular braking flanges having cast metal liners 6 with continuous extensions to the sheet metal cylindrical parts 1 beyond the ends of the liners 6, to form the shield elements of the brake drums desired.

With the method followed in producing the brake drum there is a considerable saving of cast metal over what would be required if molten metal deposited over the entire inner surface of a double width shell (such as shown in Fig. 1) after such shell had been provided with the retaining flanges 4 and then the molten iron deposited, the composite structure produced divided into two parts and so much of the cast iron liner machined away as was necessary to leave a projecting shield such as at 5a. Also, the expense of machining away such cast iron is a cost item which is avoided by the method shown and described.

The invention is one of a very practical type. It is defined in the appended claims and is not to be limited otherwise than as necessitated by the terms of the claims.

I claim:

1. The method of making brake drums which consists in providing a cylindrical shell of wrought metal with inturned annular flanges one at each end thereof, forming said shell inwardly midway between its ends to provide a continuous annular groove around the shell and a continuous annular inwardly extending rib, casting a cast metal liner between each side of the rib and each of said flanges, dividing the composite article thus produced into two parts by cutting the same midway between its ends, whereby two sections, each with an annular extension, are formed, and then bending said annular extensions to shape.

2. The method of making brake drums which consists in the steps recited in claim 1 combined with permanently securing a back of wrought metal to each of said inturned annular flanges of the parts produced by said dividing, said back being inserted within the shell before the metal has been cast therein.

3. The herein described method of producing brake drums comprising, forming a cylindrical member of wrought metal, placing a shorter cylindrical member within the first cylindrical member midway between its ends, turning inwardly an annular flange at each end of the first cylindrical member, forming an inwardly extending continuous annular groove in both cylindrical members substantially midway between their ends, casting a cast metal liner at the inner side of said first mentioned cylindrical member between each end flange thereof and the inwardly extending annular rib formed in the making of said groove, as specified.

4. A method of making brake drums which consists of the steps recited in claim 3, then cutting the composite cylindrical member formed into two parts at the bottom of said groove, removing the parts of the second cylindrical member, and bending back to substantially their original positions the parts of the first cylindrical member which formed the sides of said groove.

5. The method of producing brake drums which method consists in cutting a piece of sheet steel of sufficient width to form two brake drum shells, and length sufficient to the required circumference of the brake drum, bending the sheet steel into hoop form, joining the ends of the steel to form a cylinder, lining said cylinder intermediate its ends with a hoop of sheet metal, rolling into the periphery of the exterior of the drum shell and into said hoop an inwardly extending annular groove, bending the sides of the shell to form an inwardly extending flange at each side of the shell and casting in the drum shell a liner of iron.

6. The method of producing brake drums which method consists in providing a piece of sheet steel, forming a cylindrical member thereof, lining a portion of the width of said cylindrical member with a strip of sheet steel, forming an inwardly extending groove in the periphery of the cylindrical member and the lining thereof, flanging the two sides of the cylindrical member inwardly to form supporting flanges for the brake drum, casting in the cylindrical member a lining of iron, severing the cylindrical member, steel and iron lining into two portions and bending outward the cut edges of the said groove of each portion to form an axially extending flange and machining the said linings.

JOHN E. LINABURY.